United States Patent [19]
Geromini et al.

[11] Patent Number: 5,695,797
[45] Date of Patent: Dec. 9, 1997

[54] COEXTRUDED PET FOOD PRODUCT

[75] Inventors: Osvaldo Geromini, Valeyres/Rances, Switzerland; Minas Zafiropoulos, Corbie, France

[73] Assignee: Nestec S.A., Vevey, Switzerland

[21] Appl. No.: 585,246

[22] Filed: Dec. 22, 1995

Related U.S. Application Data

[63] Continuation of Ser. No. 191,647, Feb. 4, 1994, abandoned.

[30] Foreign Application Priority Data

Oct. 8, 1993 [EP] European Pat. Off. ............ 93116293

[51] Int. Cl.$^6$ ................................................... A23C 9/12
[52] U.S. Cl. ................. 426/62; 426/92; 426/140; 426/513; 426/546
[58] Field of Search .......................... 426/92, 62, 140, 426/513, 546

[56] References Cited

U.S. PATENT DOCUMENTS

| | | |
|---|---|---|
| 2,952,552 | 9/1960 | Ansel ........................... 426/546 |
| 3,808,340 | 4/1974 | Palmer . |
| 4,054,674 | 10/1977 | Barker et al. . |
| 4,260,635 | 4/1981 | Fisher . |
| 4,900,572 | 2/1990 | Repholz et al. . |
| 4,997,671 | 3/1991 | Spanier ........................ 426/805 |
| 5,198,257 | 3/1993 | Heck et al. . |

FOREIGN PATENT DOCUMENTS

| | | |
|---|---|---|
| 0088574 | 9/1983 | European Pat. Off. . |
| 0178187 | 4/1986 | European Pat. Off. . |
| 2444301 | 3/1975 | Germany ........................ 426/62 |
| 1502723 | 3/1978 | United Kingdom . |
| 2194125 | 3/1988 | United Kingdom ............. 426/92 |

OTHER PUBLICATIONS

Kaplao "Commercial Development of Intermediate Moisture Foods", Food Technology, vol. 24, 889, Aug. 1970, pp. 53–57.

Goldblith, et al, Ed. Freeze Drying and Advanced Food Technology, Academic Press, London 1975, pp. 619–641.

*Primary Examiner*—John J. Gallagher
*Attorney, Agent, or Firm*—Vogt & O'Donnell, LLP

[57] ABSTRACT

A composite, co-extruded food product has an outer casing and an inner filling. The outer casing is based upon a textured meat or textured fish and has a moisture content of between 20% and 40%. The filling ingredient represents between 30% and 40% of the total volume of the product and may be a vegetable oil/fat, an animal oil/fat and/or a powdered yeast.

18 Claims, 1 Drawing Sheet

COEXTRUDED PET FOOD PRODUCT

CROSS-REFERENCE TO RELATED APPLICATION

This is a continuation application of application Ser. No. 08/191,647 filed Feb. 4, 1994 and now abandoned.

BACKGROUND OF THE INVENTION

The invention concerns a coextruded product comprising an outer casing of uniform thickness and an inner filling in liquid, semi-liquid or powder form.

Composite products having an outer casing and an inner filling are already known. For example those which are the subject of European Patent Applications Publication Nos. 178187, 88574 and 487757. In these patent applications, the products concerned have cereal-based outer casings with moisture contents of between 8% and 10% by weight. With this moisture content, there is no problem of keeping at ambient temperature.

SUMMARY OF THE INVENTION

The object of the present invention is the improvement of a coextruded product which can be stored at ambient temperature and the outer casing of which has a water content which is well above 10%.

The invention concerns a coextruded product in which the outer casing with a textured meat or fish base has a moisture content of between 20%-and 40% and the filling represents between 30% and 40% of the total volume and comprises a mixture based on a product chosen from the following: vegetable oil, animal oil and yeast powder.

DETAILED DESCRIPTION OF THE INVENTION

In the present description, being able to store is understood to mean storage for more than six months at ambient temperature in sealed packaging. Except where otherwise indicated, all the percentages are by weight.

The coextruded product according to the invention is designed to be used for animal foodstuffs, for example for pets such as cats and dogs.

Textured meat or fish should be understood to mean a meat or fish paste in which the functional properties of the proteins have been partially or completely modified by heat and mechanical treatment and by means of bonding agents at the time of extrusion. Meat is intended to mean meat from chicken, rabbits, cattle or sheep, meal obtained from carcasses of the above-mentioned animals or offal. Offal is intended to mean the lobes of lungs, as well as liver or kidneys. Fish is intended to mean any type of fish or fish meal.

The coextruded product according to the invention is obtained by the process which is the subject of the patent application "Process and device for obtaining a coextruded product" filed on the same date and accored Ser. No. 08/192,161, now U.S. Pat. No. 5,449,281.

The outer casing of the product according to the invention contains in addition flour made from cereals and/or starchy foods, such as wheat or potato.

As the product according to the invention has a high moisture content, the outer casing needs to contain a preservative, such as phosphoric acid, an additive to lessen the action of the water, an anti-mould product and an antioxidant. The additive to lessen the action of the water is usually a mixture of glycerol and hydrolysed whey and it is used in a proportion of 3% to 5%. The phosphoric acid is also used in a proportion of 3% to 5% of the total weight of the outer casing. The anti-mould product is normally potassium sorbate or citrate, used in a proportion of 0.5 to 1%, and the antioxidant is BHA (butyl hydroxy anisole) or BHT (butyl hydroxy toluene) in a proportion of 0.1 to 0.2%.

The filling is liquid, semi-liquid or in powder form. To obtain a liquid or semi-liquid filling, fat, milk products or a different type of meat from that of the outer casing is used.

The filling normally consists of animal or vegetable fat having a melting point of 35° C., for example soya oil or tallow.

To improve the taste of the coextruded product according to the invention, the filling contains in addition between 5% and 20% yeast. Thus, when the filling comprises an oil/fat and yeast and the yeast is in an amount of between 5% and 20% by weight, the remainder may be fat/oil and may be in an amount of from 80% to 95% by weight, and when other additives are present, a lower amount of oil may be employed, as shown by the 77% by weight usage of fat/oil in Example 1 below.

The filling can also be in powder form. In this case, the filling is chosen from the following ingredients, alone or in combination: sugar, yeast, milk powder, vitamins, minerals.

The shape of the coextruded product is not critical. It is preferably approximately round, oval or elliptical. The coextruded product is either of a single colour or multicoloured and its dimensions are between 15 and 60 mm.

As disclosed in the '161 application and '281 patent referred to above, the temperature profile of the extruder is between 120° C. and 200° C. When animal foodstuffs are being manufactured, the process is carried out at temperatures between 150° C. and 160° C.

The filling is normally introduced at ambient temperature or above via a filling feed duct which is positioned substantially at the center of the flow of the texturized paste. When the co-extruded product comes out of the co-extrusion die, it is cooled at a temperature of about 70° C. After shaping, the co-extruded product is cooled again to a temperature of between 20° C. and 70° C.

In a particular embodiment, the casing comprises a mixture of 40% to 60% by weight of textured meat or fish, from 30% to 45% of cereal or starch flour, from 3% to 5% of phosphoric acid, as well as the additive to lessen the action of the water, the anti-mould product and the antioxidant in the proportions given above.

The coextruded product according to the invention has a pleasant palatability and may have very varied shapes compared with the products at present available on the market. Its great advantage is its elasticity.

The remainder of the description is given with reference to the drawings and examples.

DETAILED DESCRIPTION OF THE DRAWINGS

Figure 1:
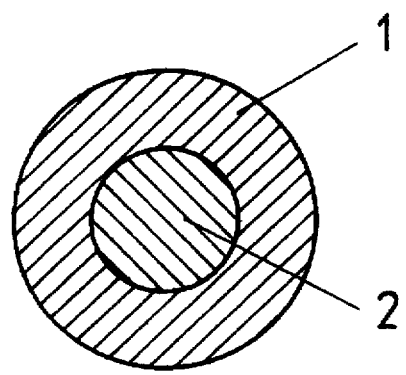
FIG. 1 represents a cross section of the product according to a first embodiment.

FIG. 1 represents a coextruded product which comprises an outer casing (1) which is meat based and has a water content of 28.5% with an $a_w$ of 0.86. The inner filling (2) is based on soya oil and yeast.

Figure 2:
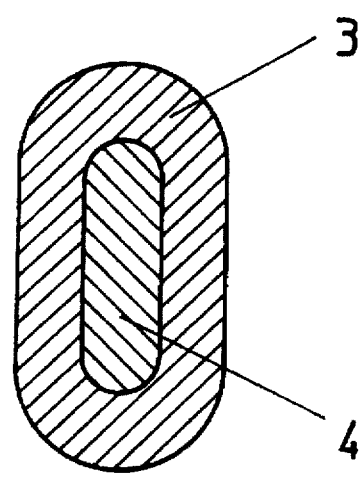
FIG. 2 represents a cross section of the product according to a second embodiment.

In FIG. 2, the outer casing (3) is fish based and has a water content of 27.5% with an $a_w$ of 0.86. The filling (4) is also based on soya oil and yeast.

EXAMPLES

The remainder of the description is given with reference to the examples.

Example 1

The filling of the coextruded product contains 77% soya oil, 20% yeast, an antioxidant, sorbate and potassium citrate and lecithin. This filling constitutes 35% of the volume of the product.

40% of the outer casing is a dry mixture of potato starch, glucose, blood plasma and wheat gluten, 50% is a suspension of lungs and pork and 10% is a suspension based on phosphoric acid for preservation and glycerol and hydrolysed whey as an additive to lessen the action of the water.

Example 2

The filling of the coextruded product is the same as for Example 1.

40% of the outer casing is a dry mixture of potato starch, glucose, blood plasma and wheat gluten, 50% is a suspension of sardines and 10% is a suspension of phosphoric acid, glycerol and hydrolysed whey.

Example 3

The filling of the coextruded product is the same as for Example 1.

40% of the outer casing is a dry mixture of wheat, potato starch, blood plasma, wheat gluten and glucose, 50% is suspension of lungs, pork, tissue and the product of autolysis of chicken and 10% is a suspension of phosphoric acid, glycerol and hydrolysed whey.

Example 4

The outer casing is the same as in Example 3, and the filling consists of 50% powdered yeast and 50% sugar.

Example 5

A mixture is made in the extruder with 50% by weight of meat suspension, 40% of a mixture containing flour and 10% of preservative suspension. The meat used is a 50/50 mixture of lungs and pork.

The meat suspension is obtained by crushing blocks frozen to –21° C., grinding and then pulverizing and then mixing with potassium sorbate, flavouring and antioxidants in a dough mixer. The flour mixture is made using potato starch, glucose, blood plasma and wheat gluten. The preservative suspension is prepared by mixing phosphoric acid, glycerol and hydrolyzed whey with a dough mixer.

The three components described above are introduced separately into a CLEXTRAL BC 72 extruder. The extruder rings are at a temperature of 22° C., 28° C., 140° C. and 160° C. The meat and flour mixture are loaded at a rate of 125 kg/h and the preservative suspension at 25 kg/h. A filling consisting of a mixture of soya oil and yeast is conveyed to the co-extruder head at a rate of 25 kg/h.

The stuffed sausage comes out at a speed of 15 m/min and is cooled by circulating water (double-casing cooler) around the sausage which has a diameter of 20 mm. The co-extruded sausage is conveyed to a UNIPLAST 160 shaper which rotates at a speed adjusted to the speed of arrival of the co-extruded sausage.

The shaped products are then cooled on a belt cooler with three levels.

We claim:

1. A composite food product comprising:
   an outer casing which comprises a food substance selected from the group consisting of textured meat and textured fish and which further comprises an additive, in an amount of from 3% to 5% by weight, to lessen the action of water and which further comprises phosphoric acid, an anti-mold product and an antioxidant and which has a moisture content of between 20% and 40 by weight; and
   a filling which is contained by the casing and which comprises an ingredient selected from the group consisting of vegetable oil/fat, animal oil/fat and a powdered yeast and which, based upon a composite food product casing and filling total volume, comprises between 30% and 40% of the total volume.

2. A product according to claim 1 wherein the filling comprises soya oil.

3. A product according to claim 1 wherein, by weight, the phosphoric acid is in an amount of from 3% to 5%, the anti-mould product is in an amount of from 0.5% to 1% and the antioxidant is in an amount of from 0.1% to 0.2%.

4. A composite food product comprising:
   an outer casing which comprises a food substance selected from the group consisting of textured meat and textured fish and which further comprises an additive, in an amount of from 3% to 5% by weight, to lessen the action of water and which further comprises phosphoric acid and an anti-mould product and which has a moisture content of between 20% and 40% by weight; and
   a filling which is contained by the casing and which comprises a powdered yeast and which, based upon a composite food product casing and filling total volume, comprises between 30% and 40% of the total volume.

5. A composite food product according to claim 4 wherein the filling further comprises an oil/fat selected from the group consisting of vegetable oil/fat and animal oil/fat.

6. A product according to claim 4 wherein the filling consists essentially of sugar and the powdered yeast.

7. A product according to claim 1 or 4 or 5 wherein the phosphoric acid is in an amount of from 3% to 5% by weight.

8. A product according to claim 1 or 4 or 5 wherein the outer casing further comprises a flour selected from the group consisting of a cereal flour and a starchy food flour.

9. A product according to claim 8 wherein, by weight, the outer casing is comprised of from 40% to 60% of the food substance and of from 30% to 45% of the flour.

10. A composite food product comprising:
    an outer casing which comprises a food substance selected from the group consisting of textured meat and textured fish and which has a moisture content of between 20% and 40% by weight; and
    a filling which is contained by the casing and which comprises a powdered yeast in an amount between 5% and 20% by weight and a fat selected from the group consisting of vegetable oil/fat and animal oil/fat in an amount of from 77% to 95% by weight and which, based upon a composite food product casing and filling total volume, comprises between 30% and 40% of the total volume.

11. A product according to claim 10 wherein the oil/fat is in an amount of from 80% to 95% by weight.

12. A product according to claim 10 wherein the filling further comprises an antioxidant.

13. A composite food product comprising:

an outer casing which comprises a food substance selected from the group consisting of textured meat and textured fish and which has a moisture content of between 20% and 40% by weight; and a filling which is contained by the casing and which consists essentially of (a) a powdered yeast, (b) a fat selected from the group consisting of vegetable oil/fat and animal oil/fat and (c) an antioxidant and which, based upon a composite food product casing and filling total volume, comprises between 30% and 40% of the total volume.

14. A product according to claim 13 wherein the yeast is in an amount between from 5% and 20% by weight.

15. A product according to claim 10 or 13 wherein the outer casing further comprises phosphoric acid, an antimould product, (an antioxidant) and an additive to lessen the action of water.

16. A product according to claim 10 or 13 wherein the outer casing further comprises a flour selected from the group consisting of a cereal flour and a starchy food flour.

17. A composite food product prepared by a process comprising, heating and extruding a mixture of a food substance selected from the group consisting of meat and fish to texturize the food substance and to obtain a hollowed casing having a moisture content of between 20% and 40% by weight and co-extruding into the casing a filling which comprises an ingredient selected from the group consisting of vegetable oil/fat, animal oil/fat and a powdered yeast to prepare a composite food product so that the filling comprises between 30% and 40% of a total volume of the composite food product.

18. A product according to claim 17 wherein the mixture is heated to a temperature of between 120° C. to 200° C. during extrusion.

* * * * *